US008978069B2

(12) United States Patent
Park et al.

(10) Patent No.: US 8,978,069 B2
(45) Date of Patent: Mar. 10, 2015

(54) E-COMMERCE SYSTEM USING CONTENT PLATFORM INDEPENDENT PRODUCT BROADCASTING

(71) Applicant: n-Commerce. Inc., Anyang-si (KR)

(72) Inventors: Jong-Bong Park, Seongnam-si (KR); Jung-Hyouk Zhang, Yongin-si (KR)

(73) Assignee: n-Commerce. Inc., Anyang-si (KR)

( * ) Notice: Subject to any disclaimer, the term of this patent is extended or adjusted under 35 U.S.C. 154(b) by 0 days.

(21) Appl. No.: 14/041,494

(22) Filed: Sep. 30, 2013

(65) Prior Publication Data

US 2014/0173659 A1 Jun. 19, 2014

(30) Foreign Application Priority Data

Dec. 14, 2012 (KR) .................. 10-2012-0146419
Jul. 18, 2013 (KR) .................. 10-2013-0084995

(51) Int. Cl.
H04N 7/16 (2011.01)
H04N 21/478 (2011.01)
H04N 21/462 (2011.01)
H04N 21/472 (2011.01)
H04N 21/482 (2011.01)
H04N 21/61 (2011.01)

(52) U.S. Cl.
CPC ..... *H04N 21/47815* (2013.01); *H04N 21/4622* (2013.01); *H04N 21/47202* (2013.01); *H04N 21/482* (2013.01); *H04N 21/6112* (2013.01); *H04N 21/6125* (2013.01)
USPC .............................. 725/48; 725/49

(58) Field of Classification Search
USPC .................................... 725/48–49
See application file for complete search history.

(56) References Cited

U.S. PATENT DOCUMENTS

| 5,923,362 | A  | * | 7/1999  | Klosterman ............... 725/48 |
| 6,314,571 | B1 | * | 11/2001 | Ogawa et al. ............. 725/48 |
| 6,637,028 | B1 | * | 10/2003 | Voyticky et al. ........... 725/42 |
| 6,934,963 | B1 | * | 8/2005  | Reynolds et al. .......... 725/39 |
| 7,395,514 | B2 | * | 7/2008  | Stern ..................... 715/854 |
| 7,634,792 | B2 | * | 12/2009 | Michel et al. ............. 725/48 |
| 7,644,428 | B2 | * | 1/2010  | Akiyama .................. 725/49 |
| 7,665,109 | B2 | * | 2/2010  | Matthews et al. .......... 725/51 |
| 7,788,686 | B1 | * | 8/2010  | Andrews .................. 725/32 |

(Continued)

FOREIGN PATENT DOCUMENTS

JP  2005-094788 A    4/2005
JP  10-2011-0079598 A  7/2011

(Continued)

OTHER PUBLICATIONS

International Search Report mailed Nov. 25, 2013 in International Application No. PCT/KR2013/007070 (3 pages, in Korean).

*Primary Examiner* — Fernando Alcon
(74) *Attorney, Agent, or Firm* — NSIP Law

(57) ABSTRACT

The following description relates to an e-commerce system using content platform independent product broadcasting which combines a channel map for pay TV broadcasts provided over a broadcasting network with a channel map for product broadcasts provided over the Internet to thereby generate an integrated channel map. Using the integrated channel map, a user is able to easily connect to or change a product broadcast provided over the Internet with simple manipulation so as to perform an e-commerce transaction using content platform independent product broadcasting.

10 Claims, 6 Drawing Sheets

(56) References Cited

U.S. PATENT DOCUMENTS

| | | | |
|---|---|---|---|
| 8,082,568 B2 * | 12/2011 | Ellis | 725/48 |
| 8,156,527 B2 * | 4/2012 | Walter et al. | 725/45 |
| 8,209,721 B2 * | 6/2012 | Trauth | 725/46 |
| 8,225,354 B2 * | 7/2012 | Acton et al. | 725/49 |
| 8,266,655 B2 * | 9/2012 | Klosterman | 725/48 |
| 8,286,207 B1 * | 10/2012 | Schneidewend et al. | 725/58 |
| 8,316,396 B2 * | 11/2012 | Kulick et al. | 725/48 |
| 8,327,404 B2 * | 12/2012 | Roberts et al. | 725/61 |
| 8,424,040 B2 * | 4/2013 | Klosterman | 725/48 |
| 8,448,208 B2 * | 5/2013 | Moreau et al. | 725/45 |
| 8,640,170 B2 * | 1/2014 | Klosterman | 725/48 |
| 8,732,761 B2 * | 5/2014 | Mathews et al. | 725/48 |
| 2003/0051246 A1 * | 3/2003 | Wilder et al. | 725/49 |
| 2003/0056218 A1 * | 3/2003 | Wingard et al. | 725/46 |
| 2004/0078807 A1 * | 4/2004 | Fries et al. | 725/14 |
| 2005/0015815 A1 * | 1/2005 | Shoff et al. | 725/135 |
| 2006/0037046 A1 * | 2/2006 | Simms et al. | 725/56 |
| 2006/0259926 A1 * | 11/2006 | Scheelke et al. | 725/48 |
| 2009/0094646 A1 * | 4/2009 | Walter et al. | 725/48 |
| 2012/0036522 A1 | 2/2012 | Wang | |
| 2012/0066062 A1 * | 3/2012 | Yoder et al. | 705/14.51 |
| 2012/0066064 A1 * | 3/2012 | Yoder et al. | 705/14.53 |
| 2012/0158517 A1 * | 6/2012 | Rathod | 705/14.66 |
| 2012/0166306 A1 * | 6/2012 | Alexander | 705/26.8 |
| 2012/0266194 A1 * | 10/2012 | Klosterman | 725/48 |
| 2014/0068678 A1 * | 3/2014 | Rodrigues et al. | 725/48 |
| 2014/0109144 A1 * | 4/2014 | Asnis et al. | 725/48 |
| 2014/0130098 A1 * | 5/2014 | Kim et al. | 725/48 |

FOREIGN PATENT DOCUMENTS

| | | |
|---|---|---|
| KR | 10-2009-0088687 A | 8/2009 |
| KR | 10-2010-0084811 A | 7/2010 |
| WO | WO 2007/004814 A1 | 1/2007 |

* cited by examiner

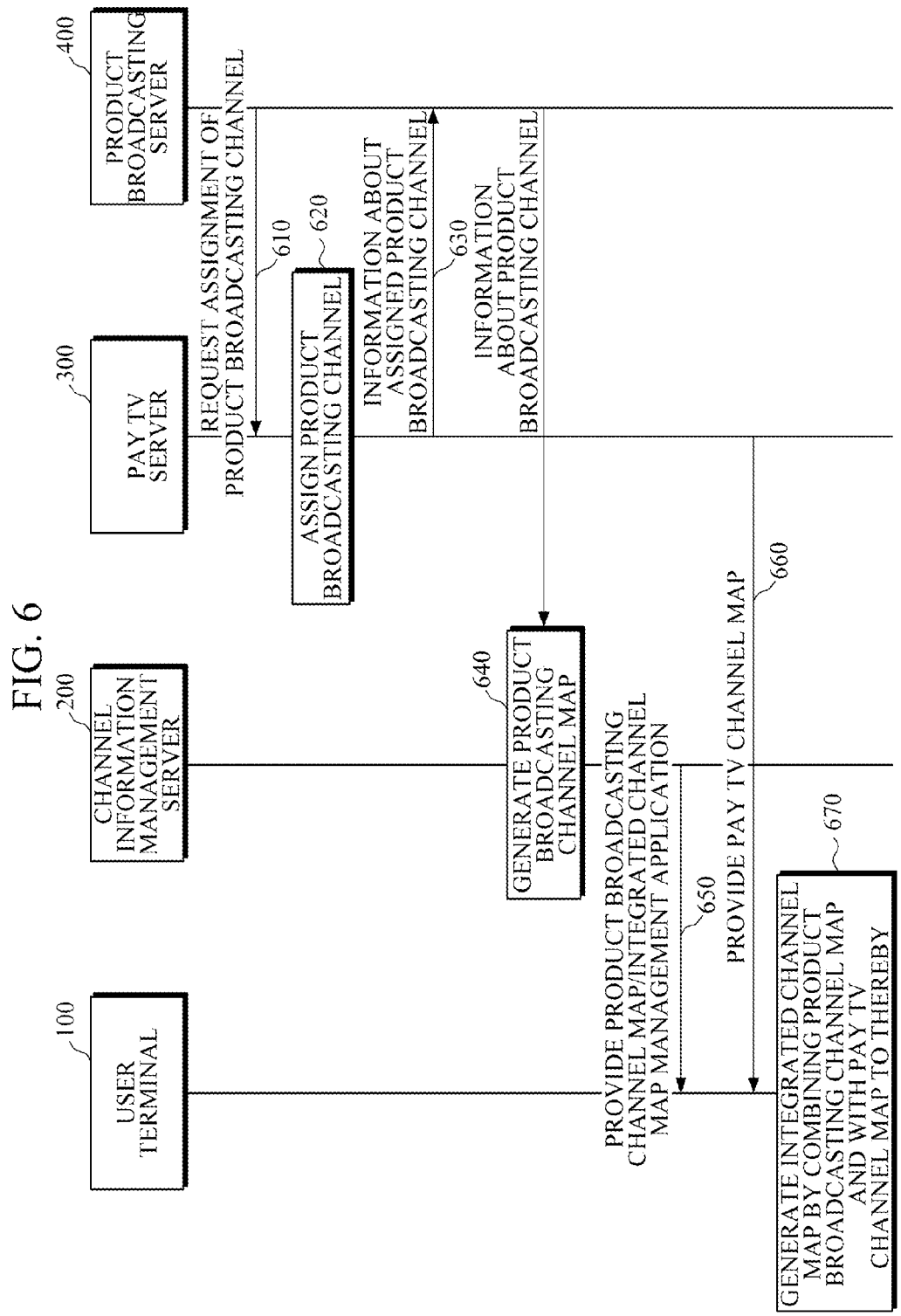

E-COMMERCE SYSTEM USING CONTENT PLATFORM INDEPENDENT PRODUCT BROADCASTING

CROSS-REFERENCE TO RELATED APPLICATIONS

This application claims the benefit under 35 U.S.C. §119 (a) of Korean Patent Application Nos. 10-2012-0146419, filed on Dec. 14, 2012, and 10-2013-0084995, filed on Jul. 18, 2013, in the Korean Intellectual Property Office, the entire disclosures of which are incorporated herein by references for all purposes.

BACKGROUND

1. Field

The following description relates to a broadcasting technology, and, more particularly, to an e-commerce system using content platform independent product broadcasting.

2. Description of Related Art

Korean Patent Publication No. 10-2010-0084811 (filed on Jul. 28, 2010), titled "IPTV SETTOP BOX, SYSTEM AND METHOD FOR TWO-WAY SERVICE WITH IPTV BROADCASTING," introduces a broadcasting technology using a set top box.

In this reference, the number of normal broadcasting channels and a frequency bandwidth of each normal broadcasting channel are limited. In addition, although the number of broadcasting channels on the Internet is almost infinite, it is hard to connect to the Internet using a set top box provided by a pay TV operator.

In order to overcome the drawbacks, the inventor of the present invention started to study an e-commerce technology that has advantages of both pay TV and the Internet, so that a user may change "a product broadcast or other content (hereinafter, referred to as 'product broadcast') provided over the Internet or perform an e-commerce transaction by manipulating a remote controller, a touch screen or a keyboard using a set top box of a broadcasting operator or a mobile terminal.

SUMMARY

The following description is designed to provide an e-commerce system using content platform independent product broadcasting, the e-commerce system which generates an integrated channel map by combining a channel map of pay TV provided over a broadcasting network with a channel map of product broadcasts provided over the Internet and manage the generated integrated channel map, so that a user may easily connect to or change product broadcast provided over the Internet or perform an e-commerce transaction by manipulating a remote controller, a touch screen or a keyboard.

In one general aspect, an e-commerce system using content platform independent product broadcast is provided, and the e-commerce system includes a channel map manager configured to executes an integrated channel map management application to generate an integrated channel map that is a combination of a pay TV channel map of pay TV broadcasts provided over a broadcasting network and a product broadcasting channel map of product broadcasts provided over the Internet and to manage the integrated channel map; a channel map storage configured to store the integrated channel map; a channel manager configured to, in response to channel manipulation of a user, select a channel with reference to the integrated channel map stored in the channel map storage; and a broadcasting processor configured to, in response to the channel manager selecting a pay TV channel, play pay TV signals transmitted from the selected pay TV channel and, in response to the channel manager selecting a product broadcasting channel, play product broadcasting signals transmitted from the selected product broadcasting channel.

The channel manager may include a channel number recognizer configured to recognize a channel number in response to the channel manipulation of the user; a channel searcher configured to search the integrated channel map for a channel corresponding to the channel number recognized by the channel number recognizer; and a channel changer configured to cancel connection to a current channel and connect to the channel found by the channel searcher.

The e-commerce system may further include a channel information management server configured to generate the channel map of product broadcasts provided over the Internet, and to provide a user terminal with the generated channel map of product broadcasting and an integrated channel map management application.

The channel information management server may include a product broadcasting channel information collector configured to collect broadcasting channel information from a product broadcasting server providing product broadcasting over the Internet; a channel map generator configured to analyze the collected broadcasting channel information to thereby generate a product broadcasting channel map; an application storage configured to store an integrated channel map management application; and a channel map provider configured to provide the user terminal the product broadcasting channel map generated by the channel map generator and the integrated channel map management application stored in the application storage.

The channel map generator may generate the product broadcasting channel map by searching the collected product broadcasting channel information for a product broadcasting channel and mapping a URL of product broadcasting content, a channel connection menu, a product broadcasting program identification (ID) or a product IP ID to the found product broadcasting channel.

The channel map generator may generate a different product broadcasting channel map for each local area.

The e-commerce system may further include a channel manager configured to, in response to a request for assignment of a product broadcasting channel from the product broadcasting server, assign at least one pay TV channel, a predetermined scheduled time period of a predetermined pay TV channel, or a channel connection menu to the product broadcasting server as a product broadcasting channel; and a pay TV processor configured to provide the user terminal with broadcasting streams of channels other than the assigned product broadcasting channel.

The e-commerce system may further include a product broadcasting channel requestor configured to request that a pay TV server assign a product broadcasting channel and to become assigned with the at least one pay TV channel, the predetermined scheduled time period of a predetermined pay TV channel, or the channel connection menu to the product broadcasting server as a product broadcasting channel; and a product broadcasting processor configured to, if the user terminal selects the product broadcasting channel assigned by the pay TV server through the product broadcasting channel requestor, provide over the Internet product broadcasting content to be broadcasted on the selected product broadcasting channel to the user terminal.

If the at least one pay TV channel is selected by the user terminal as a product broadcasting channel, the product broadcasting processor may connect the user terminal directly to a URL of the product broadcasting content, the URL mapped to the pay TV channel.

If the predetermined scheduled time period of a predetermined pay TV channel is selected by the user terminal as a product broadcasting channel, the product broadcasting processor may provide product broadcasting content corresponding to a product broadcasting program identification (ID) or product ID mapped to the predetermined schedule time period of a predetermined pay TV channel by reading an URL of the product broadcasting content, the URL mapped to the product broadcasting program ID or product ID.

If the channel connection menu is selected by the user terminal as a product broadcasting channel, the product broadcasting processor may provide product broadcasting content mapped to the channel connection menu by reading a URL of the product broadcasting content, the URL mapped to the channel connection menu.

The user terminal may include an e-commerce transaction requestor configured to, in is response to an input from a remote controller, a touch screen or a keyboard while signals of the product broadcasting channel are being played, execute an e-commerce transaction request application regarding to the a product broadcasting on the product broadcasting channels.

The e-commerce system may further include an e-commerce server configured to processing an e-commerce transaction requested through the e-commerce transaction request application and divide profits between product broadcasting channels.

The e-commerce server periodically may collect a view history and product orders of each product broadcasting channel from the user terminal and analyze the collected view history and the collected product orders.

Other features and aspects may be apparent from the following detailed description, the drawings, and the claims.

BRIEF DESCRIPTION OF THE DRAWINGS

FIG. 6 is a flow chart illustrating a method for providing product broadcasting of an e-commerce system using content platform independent product broadcasting according to an exemplary embodiment of the present invention.

Figure 1:
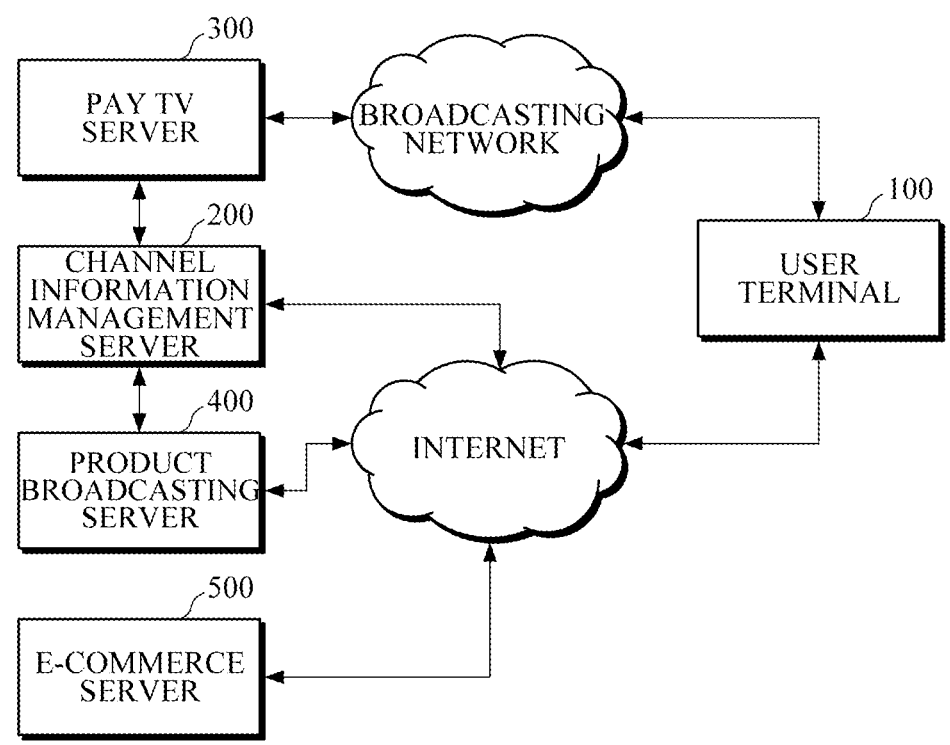
FIG. 1 is a diagram illustrating a configuration of a network of an e-commerce system using content platform independent product broadcasting according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a network of an e-commerce system using content platform independent product broadcasting according to an exemplary embodiment of the present invention. Referring to FIG. 1, an e-commerce system using content platform independent product broadcasting includes a plurality of user terminals 100 belonging to broadcast subscribers, a channel information management server 200, a pay TV server 300, a product broadcast server 400 and an e-commerce server 500. Herein, product broadcasting refers to a broadcast that relates to a product for promotion, marketing, advertisement, sales and other purposes.

A user terminal 100 generates an integrated channel map by combining a channel map of pay TV broadcasts provided from the pay TV server 300 over a broadcast network (hereinafter, referred to a pay TV channel map) with a channel map of product broadcasts provided from the channel information management server 200 over the Internet (hereinafter, referred to as a product broadcasting channel map). With reference to the integrated channel map, the user terminal 100 receives pay TV content from the pay TV server 300 and product broadcasting content from the product broadcast server 400.

Using the integrated channel map, the user terminal 100 easily connects to and changes a product broadcast provided from the product broadcast server 400 simply by manipulating a remote controller, a touch screen or a keyboard, as if changing a pay TV channel provided over a broadcast network. In this manner, content platform independent product broadcasting is possible.

The user terminal 100 may be a set top box for pay TV provider, an Over The Top (OTT) set top box or any devices that belong to user, such as, for example, a smart TV, a Personal Computer (PC), a smart phone and a mobile terminal which is able to connect the Internet and server as a set top box.

The channel information management server 200 generates a product broadcasting channel map for product broadcasts provided over the Internet, and provides the generated product broadcasting channel map and an integrated channel map management application to the user terminals 100 of broadcast subscribers.

When generating the product broadcasting channel map, the channel information management server 200 maps a URL of a product broadcasting content provided by a content platform operator, a channel connection menu, a product broadcasting program identification (ID) or a product ID to the product broadcasting channel map. In this case, if changing the URL of product broadcasting content, the channel connection menu, the product broadcasting program ID or the product ID, a user may easily navigate and enjoy the desired product broadcasting content simply by manipulating a channel, so that an e-commerce transaction is possible using content platform independent product broadcasting.

In response to a request for assignment of a product broadcasting channel from the product broadcast server 400, the pay TV server 300 assigns one or more pay TV channels among the entire pay TV channels, a particular scheduled time period of a predetermined pay TV channel, or a channel connection menu as a product broadcasting channel, and provide broadcast streams of channels other than product broadcasting channels to the user terminal 100. Concurrently, the pay TV server 300 provides a pay TV channel map to the user terminal 100.

By requesting that the pay TV server 300 assigns a product broadcasting channel, the product broadcast server 400 is assigned with at least one pay TV channel, the particular schedule time period of a pay TV channel, or a channel connection menu as a product broadcasting channel. If the user terminal 100 selects an assigned product broadcasting channel, the product broadcast server 400 provides product broadcasting content, scheduled to be broadcasted, to the user terminal 100 through the selected product broadcasting channel over the Internet.

The e-commerce server 500 performs e-commerce transaction requested through an e-commerce request application that is executed by the user terminal 100, and divides profits between product broadcasting channels.

In the above example, with an integrated channel map that is a combination of a channel map of pay TV broadcasts provided over a broadcast network and a channel map of product broadcasts provided over the Internet, a user may easily connect to and change a product broadcast provided over the Internet simply or perform e-commerce transaction by manipulating a remote controller, a touch screen or a keyboard. In this manner, the user may enjoy e-commerce using content platform independent broadcast.

Figure 2:
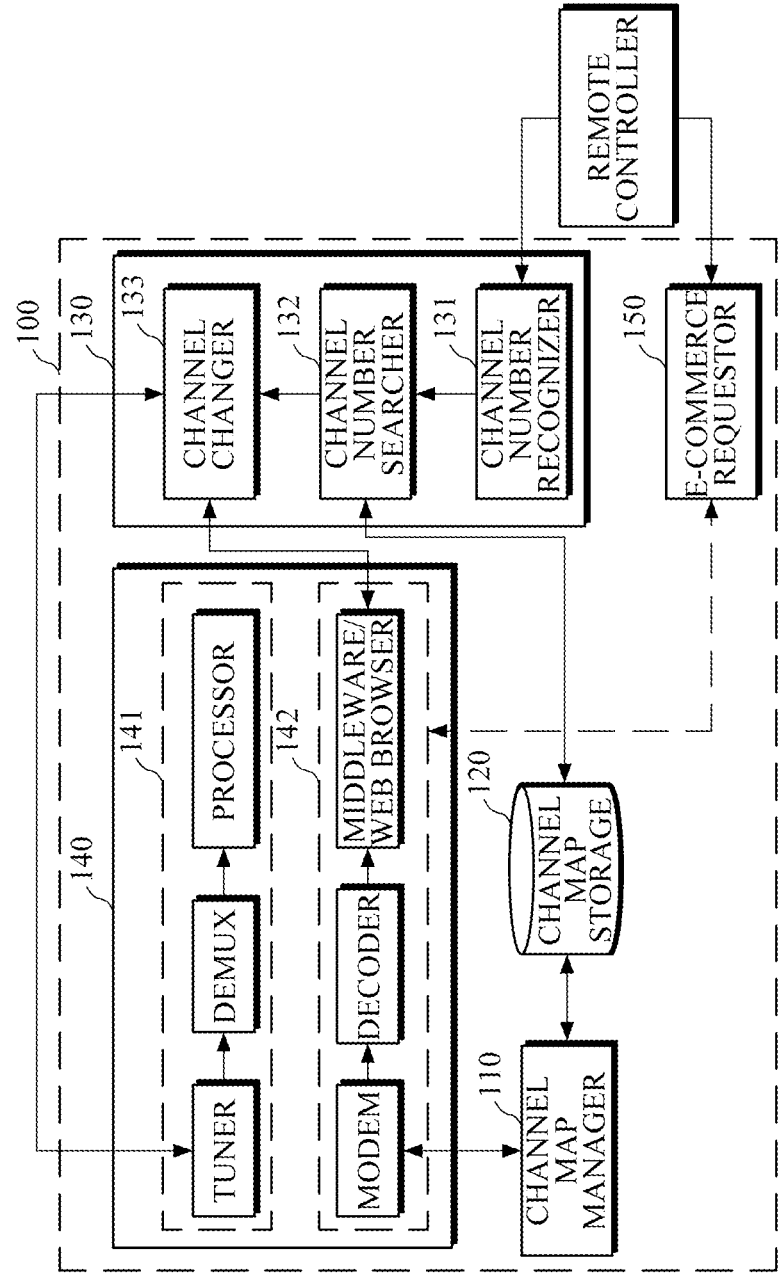
FIG. 2 is a block diagram illustrating a configuration of a user terminal of an e-commerce system using content platform independent product broadcasting according to an exemplary embodiment of the present invention.

FIG. 2 is a block diagram illustrating a configuration of a user terminal of an e-commerce system using content platform independent product broadcast according to an exemplary embodiment of the present invention. Referring to FIG. 2, a user terminal 100 includes a channel map manager 110, a channel map storage 120, a channel manager 130 and a broadcasting processor 140.

The channel map manager 110 executes an integrated channel map management application to generate an integrated channel map that is a combination of a pay TV channel map of pay TV broadcasts provided over a broadcasting network and a product broadcasting channel map of product broadcasts provided over the Internet, and to manage the integrated channel map.

The channel map manager 110 receives a pay TV channel map from the pay TV server 300 while receiving a product broadcasting channel map and an integrated channel map management application from the channel information management server 200. Using the integrated channel map management application, the channel map manager 110 may generate an integrated channel map by combining the pay TV channel map with the product broadcasting channel map and manage the integrated channel map.

The channel map storage 120 stores the integrated channel map managed by the channel map manager 110. The integrated channel map, which is generated by combining the pay TV channel map with the product broadcasting channel map and stored in the channel map manager 110, may be different according to a local area.

For example, the integrated channel map may include channel numbers distinctive for each channel and broadcast-type information. In addition, the pay TV channel may be mapped with a broadcast frequency bands that a tuner receives, while the product broadcasting channel may be mapped with a URL of product broadcasting content provided by a content platform operator, a channel connection menu, an identification (ID) for each product broadcast program, and product IDs.

The URL of product broadcasting content may be a URL of a content server (not shown) managed by a content platform operator. The channel connection menu may be a distinctive identification code assigned to a particular menu able to be selected from user interface software of a user terminal, and the distinctive identification code may be further mapped with a URL of product broadcasting content. The ID for a product broadcast program may be ID used to identify each product broadcast program, and the ID may be further mapped with a URL of product broadcasting content. A product ID may be a distinctive ID of each product, and may be further mapped with a URL of product broadcasting content.

For example, broadcast-type information of '001' may represent a pay TV channel on which a pay TV broadcast is provided to a broadcast subscriber, and broadcast type information of '002' may represent a product broadcasting channel providing a product broadcast.

In response to channel manipulation of a user, the channel manager 130 selects a channel with reference to an integrated channel map stored in the channel map storage 120. For example, the channel manager 130 may include a channel number recognizer 131, a channel searcher 132, and a channel changer 133.

The channel number recognizer 131 recognizes a channel number according to channel manipulation of a user. The channel manipulation of a user may occur by the user's manipulation of a remote controller, a touch screen, or a keyboard.

For example, the channel number recognizer 131 may recognize a channel number from a remote signal. If a user manipulates a remote controller (not shown) to select a channel number, the remote controller may transmit a remote signal to the user terminal 100 and then the channel number recognizer 131 may recognize the channel number selected by the user from the remote signal.

The channel searcher 132 searches the integrated channel map for a channel corresponding to the channel number recognized by the channel number recognizer 131. For example, the channel searcher 132 searches the integrated channel map for a channel corresponding to the channel number recognized by the channel number recognizer 131 to see whether the found channel is a pay TV channel or a product broadcasting channel based on broadcast type information of the found channel.

The channel changer 133 cancels connection to the current channel and connects the channel found by the channel searcher 132. For example, if the channel found by the channel searcher 132 is a pay TV channel, the channel changer 133 may change to the selected channel by requesting that a tuner receives pay TV signals of a broadcast frequency band mapped to the pay TV channel.

As another example, if the channel found by the channel searcher 132 is a product broadcasting channel (such as at least one pay TV channel, a particular schedule time period of a particular pay TV channel, and a channel connection menu), the channel changer 133 may change to the selected product broadcasting channel by requesting that a middleware or a web browser of a user terminal connect to a URL of product broadcasting content provided by a content platform operator, a channel connection menu, a product program ID, a URL of product broadcasting content corresponding to a product ID, all of which are mapped to the product broadcasting channel.

The broadcasting processor 140 plays signals from a pay TV channel or a product broadcasting channel selected by the channel manager 130. For example, the broadcasting processor 140 may include a pay TV processor 141 and a product broadcasting processor 142.

The pay TV processor 141 plays signals transmitted from a pay TV channel selected by the channel manager 130. For example, the pay TV processor 141 may include a tuner configured to select a broadcast frequency band, a DEMUX configured to demultiplex signals from a broadcast frequency band selected by the tuner, and a processor configured to process and play the signal demultiplexed by the DEMUX.

The product broadcasting processor 142 plays signals from a product broadcasting channel selected by the channel manager 130. For example, the product broadcasting processor 142 may include a modem configured to receive signals from a product broadcasting channel, a decoder configured to decode the received signal, and a web browser configured to browse the decoded signal.

As such, using an integrated channel map that is a combination of a pay TV channel map of pay TV broadcasts provided over a broadcasting network and a product broadcasting channel map for product broadcasts provided over the Internet, a user may easily change a product broadcast by manipulating a remote controller, a touch screen or a key board. In this manner, a content platform independent broadcast is possible.

Figure 3:
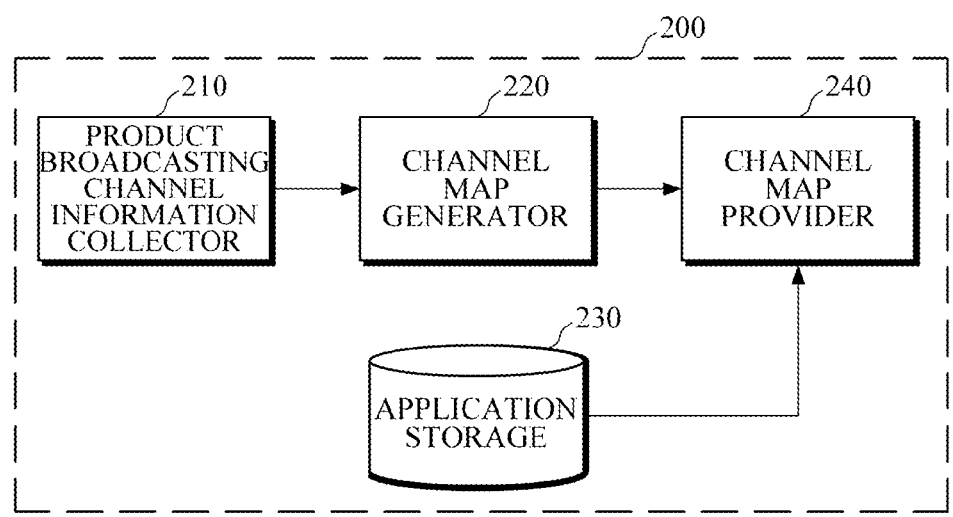
FIG. 3 is a block diagram illustrating a configuration of a channel information management server of an e-commerce system using content platform independent product broadcasting according to an exemplary embodiment of the present invention.

FIG. 3 is a block diagram illustrating a configuration of a channel information management server of an e-commerce system using content platform independent product broadcasting according to an exemplary embodiment of the present invention. The channel information management server 200 generates a product broadcasting channel map for product broadcasts provided over the Internet, and provides the generated product broadcasting channel map to user terminals 100 of broadcast subscribers along with an integrate channel map management application.

As illustrated in FIG. 3, the channel information management server 200 includes a product broadcasting channel information collector 210, a channel map generator 220, an application storage 230, and a channel map provider 240.

The product broadcasting channel information collector 210 collects a product broadcasting channel information from a product broadcast server 400. The product broadcasting channel information server 400 requests that the pay TV server 300 assign a product broadcasting channel from the pay TV server 300, and become assigned with at least one pay TV channel, a particular schedule time period of a particular pay TV channel, or a channel connection menu as a product broadcasting channel. In this manner, the product broadcasting channel information collector 210 may collect information about a product broadcasting channel assigned by the product broadcast server 400.

The channel map generator 220 generates a product broadcasting channel map by analyzing the product broadcasting channel information collected by the product broadcasting channel information collector 210. In more detail, the channel map generator 220 may generate a product broadcasting channel map by searching the collected product broadcasting channel information for a product broadcasting channel and mapping a URL of product broadcasting content, a channel connection menu, a product broadcast program ID or a product ID to the found product broadcasting channel.

The channel map generator 220 may generate a different product broadcasting channel map for each local area. For example, while mapping a post code to a local area ID to thereby generate a local ID, the channel map generator 220 may concurrently map a different URL product broadcasting content, a channel connection menu, a product broadcasting program ID or a product ID to the same product broadcasting channel, thereby making product broadcasting adaptive to local broadcasting.

The application storage 230 stores an integrate channel map management application. The integrated channel map management application is software that is provided to user terminals 100 of broadcasting subscribers to generate an integrated channel map by combining a pay TV channel map with a product broadcasting channel map and to manage the integrated channel map. The integrated channel map management application may be coded by a developer in advance and then stored in the storage 230. In more detail, the integrated channel map management application may be coded according to a type of a user terminal (that is, a model or an Operating System (OS) of the user terminal) and then stored in the application storage 230.

The channel map provider 240 provides the user terminal 100 with the product broadcasting channel map generated by the channel map generator 220 and the integrated channel map management application stored in the application storage 230.

For example, the channel map provider 240 may collect specification from the user terminal 100, select an integrated channel map management application suitable for the collected specification of the user terminal 100, and provide the selected integrated channel map management application to the user terminal along with a product broadcasting channel map generated by the channel map generator 220.

In addition, if receiving a request for a channel connection menu of a product broadcasting channel from a middleware of the user terminal 100, the channel map provider 240 may search for a URL of product broadcasting content corresponding to the requested channel connection menu with reference to a product broadcasting channel map mapped with the URL of product broadcasting content, and then may help the user terminal 100 to connect to the URL of product broadcasting content.

After receiving the product broadcasting channel map from the channel map provider 240 along with the integrated channel map management application, the user terminal 100 may execute the integrated map management application to generate an integrated channel map by combining the product broadcasting channel map received from the channel information management server 200 with the pay TV channel map from the pay TV server 300. With reference to the integrated channel map, a user may change a product broadcast provided over the Internet by manipulating a remote controller, a touch screen or a keyboard.

Meanwhile, if the channel information management server 200 maps a URL of product broadcasting content, a channel connection menu, a product broadcast program ID or a product ID to a product broadcasting channel when generating a product broadcasting channel map, a user may change product broadcasting content with simple manipulation, and thus, content platform independent broadcasting may be possible.

Figure 4:
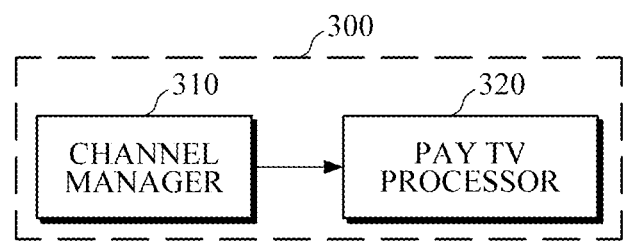
FIG. 4 is a block diagram illustrating a configuration of a pay TV server of an e-commerce system using content platform independent product broadcasting according to an exemplary embodiment of the present invention.

FIG. 4 is a block diagram illustrating a configuration of a pay TV server of an e-commerce system using content platform independent broadcasts according to an exemplary embodiment of the present invention. As illustrated in FIG. 4, the pay TV server 300 includes a channel manager 310 and a pay TV processor 320.

In response to a request for assignment of a product broadcasting channel from the product broadcast server 400, the channel manager 310 assigns at least one pay TV channel from among the entire pay TV channels, a particular schedule time period of a particular pay TV channel, or a channel connection menu as a product broadcasting channel.

The pay TV processor 320 provides a user terminal of a broadcasting subscriber with broadcasting streams of channels other than product broadcasting channels that are assigned by the channel manager 310. In this manner, the pay TV server 300 may broadcast pay TV channels other than an assigned product broadcasting channel.

Figure 5:
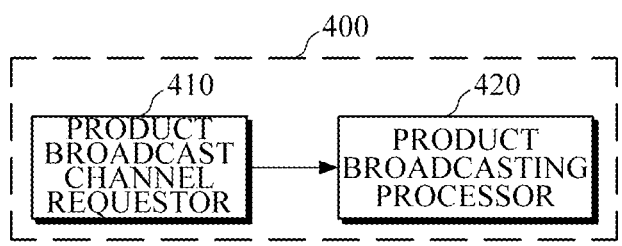
FIG. 5 is a block diagram illustrating a configuration of a product broadcasting server of an e-commerce system using content platform independent product broadcasting according to an exemplary embodiment of the present invention.

FIG. 5 is a block diagram illustrating a configuration of a product broadcast server of an e-commerce system using content platform independent product broadcasting according to an exemplary embodiment of the present invention. As illustrated in FIG. 5, the product broadcast server 400 includes a channel requestor 410 and a product broadcasting processor 420.

The product broadcasting channel requestor 410 requests that the pay TV server 300 assign a product broadcasting channel, and become assigned with at least one pay TV channel from among the entire pay TV channels, a predetermined scheduled time period of a pay TV channel, or a channel connection menu as a product broadcasting channel.

If the user terminal 100 selects the product broadcasting channel that is assigned by the pay TV server 300 using the product broadcasting channel requestor 410, the product broadcasting processor 420 provides product broadcasting content, which is scheduled to be broadcasted, to the user terminal 100 over the Internet.

For example, if at least one of pay TV channel is selected by the user terminal 100 as a product broadcasting channel, the product broadcasting processor 420 may connect the user terminal 100 directly to a URL of product broadcasting content, which is mapped to the pay TV channel. It is an example in which the user terminal is assigned with a pay TV channel as a product broadcasting channel, and the pay TV channel is mapped with a URL of product broadcasting content.

As another example, if a particular schedule time period of a particular pay TV channel is selected by the user terminal 100 as a product broadcasting channel, the product broadcasting processor 420 may provide the user terminal with product broadcasting content corresponding to a product broadcasting program ID or product ID mapped to the particular scheduled time period of a particular pay TV channel by reading a URL of the product broadcasting content, which is mapped to the product broadcasting program ID or product ID. It is an example in which a product broadcasting program ID or product ID mapped to a particular scheduled time period of a particular product broadcasting channel is assigned as a product broadcasting channel, and a URL of product broadcasting content is mapped to the product broadcasting program ID or product ID.

As yet another example, if a channel connection menu is selected by the user terminal 100 as a product broadcasting channel, the product broadcasting processor 420 may provide the user terminal with product broadcasting content by reading a URL of the product broadcasting content which is mapped to the channel connection menu. It is an example in which a channel connection menu is assigned as a product broadcasting channel, and a URL of product broadcasting content is mapped to the channel connection menu. Based on the above configuration, the product broadcast server 400 may broadcast a product broadcasting channel assigned by the pay TV server 300.

In another embodiment, the user terminal 100 may further include an e-commerce transaction requestor 150. If a predetermined key of a remote controller, a touch screen or a keyboard is input when signals from a product broadcasting channel are being played, the e-commerce transaction requestor 150 executes an e-commerce request application for a product that is currently broadcasted on the corresponding product broadcasting channel to make a transaction for the product.

For example, using an e-commerce request application, a seller may input a sales order and a buyer may input a purchase order, make payment with a credit card, account transfer or a mobile phone, and input name, address and/or phone number of a recipient. In this manner, an e-commerce transaction on a product currently broadcasted on a product broadcasting channel may be possible.

As another example, the e-commerce server 500 may perform e-commerce processing requested through the e-commerce request application, and divide profits between product broadcasting channels.

That is, the e-commerce server 500 manages all the transaction orders regarding to product broadcasting channels and divide profits between the product broadcasting channels to provide some of the divided profits to a content platform operator. At this point, the e-commerce server 500 may pay fees for product broadcasting operation by giving a product broadcast operator some of the divided profits. Meanwhile, the product broadcast operator may pay fees for assignment of a product broadcasting channel to a pay TV operator.

The e-commerce server 500 may periodically collect and analyze a view history or product orders of each product broadcasting channel from the user terminal 100, so that the e-commerce server 500 may collect and analyze the collected historical data of each product broadcasting channel.

A method for providing a product broadcast of the above-described e-commerce system using content platform independent product broadcasting will be provided with reference to FIG. 6. FIG. 6 is a flow chart illustrating a method for providing a product broadcast of an e-commerce system using content platform independent product broadcasting according to an exemplary embodiment of the present invention.

In 610, a product broadcast server requests that a pay TV server assign a product broadcasting channel.

In 620, the pay TV server assigns at least one pay TV channel among the entire pay TV channels, a particular scheduled time period of a pay TV channel, or a channel connection menu as a product broadcasting channel.

In 630, the pay TV server transmits information about the assigned product broadcasting channel to the product broadcast server.

In 640, a channel information management server generates a product broadcasting channel map by collecting product broadcasting channel information and analyzing the collection of information about the product broadcasting channel. At this time, the channel information management server may generate a product broadcasting channel map by mapping a URL of product broadcasting content, a channel connection menu, a product broadcast program ID or a product ID to the product broadcasting channel.

In 650, the channel information management server provides the product broadcasting channel map and an integrated channel map management application to the user terminal.

In 660, the pay TV server provides a pay TV channel map to the user terminal.

In 670, with receiving the pay TV channel map, the product broadcasting channel map and the integrated channel map management application, the user terminal executes the integrated channel map management application to generate an integrated channel map by combining the pay TV channel map and manage the integrate channel map with the product broadcasting channel map.

In response to a user's manipulation of a remote controller, a touch screen or a keyboard to change a channel, the user terminal selects a channel with reference to the integrated channel map. In this manner, a pay TV over a broadcasting network or a product broadcast over the Internet is possible.

The present invention combines a channel map of pay TV broadcasts provided over a broadcasting network and a channel map of product broadcasts provided over the Internet into an integrated channel map and manages the integrated channel map, so that a user may easily connect to and changes a product broadcast provided on the Internet or perform an e-commerce transaction by manipulating a remote control, a touch screen or a keyboard.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An e-commerce system using content platform independent product broadcast, the e-commerce system comprising:
   a user terminal comprising
      a first processor,
      a channel information management server comprising a second processor,
      a channel map manager configured to execute an integrated channel map management application to generate an integrated channel map that is a combination of a pay TV channel map of pay TV broadcasts provided over a broadcasting network and a product broadcasting channel map of product broadcasts provided over the Internet and to manage the integrated channel map,
      a channel map storage configured to store the integrated channel map,
      a channel manager configured to, in response to a channel manipulation of a user, select a channel with reference to the integrated channel map stored in the channel map storage, and
      a broadcasting processor configured to, in response to the channel manager selecting a pay TV channel, play pay TV signals transmitted from the selected pay TV channel and, in response to the channel manager selecting a product broadcasting channel or a scheduled time period of the pay TC channel or a channel connection menu pay, play product broadcast signals transmitted from the selected product broadcasting channel; and
   a pay TV server comprising
      a channel manager of the pay TV server configured to, in response to a request for assignment of the product broadcasting channel from a product broadcasting server, assign at least one pay TV channel, a predetermined scheduled time period of a predetermined pay TV channel, a channel connection menu to the product broadcasting as the product broadcasting channel, and
      a pay TV processor configured to provide the user terminal with broadcasting streams of channel other than the assigned product broadcasting channel.

2. The e-commerce system of claim 1, wherein the channel manager comprises:
   a channel number recognizer configured to recognize a channel number in response to the channel manipulation of the user;
   a channel searcher configured to search the integrated channel map for a channel corresponding to the channel number recognized by the channel number recognizer; and
   a channel changer configured to cancel connection to a current channel and connect to the channel found by the channel searcher.

3. The e-commerce system of claim 1, further comprising:
   a channel information management server configured to generate the channel map of product broadcasts provided over the Internet, and to provide a user terminal with the generated channel map of product broadcasting and an integrated channel map management application.

4. The e-commerce system of claim 3, wherein the channel information management server comprises:
   a product broadcasting channel information collector configured to collect broadcasting channel information from a product broadcast server providing product broadcasting over the Internet;
   a channel map generator configured to analyze the collected broadcasting channel information to thereby generate a product broadcasting channel map;
   an application storage configured to store an integrated channel map management application; and
   a channel map provider configured to provide the user terminal the product broadcasting channel map generated by the channel map generator and the integrated channel map management application stored in the application storage.

5. The e-commerce system of claim 4, wherein the channel map generator generates the product broadcasting channel map by searching the collected product broadcasting channel information for a product broadcasting channel and mapping a URL of product broadcasting content, a channel connection menu, a product broadcasting program identification (ID) or a product ID to the found product broadcasting channel.

6. The e-commerce system of claim 4, wherein the channel map generator generates a different product broadcasting channel map for each local area and each user terminal.

7. The e-commerce system of claim 1, further comprising:
   a product broadcasting channel requestor configured to request that a pay TV server assign a product broadcasting channel and to become assigned with the at least one pay TV channel, the predetermined scheduled time period of a predetermined pay TV channel, or the channel connection menu to the product broadcasting server as a product broadcasting channel; and
   a product broadcasting processor configured to, if the user terminal selects the product broadcasting channel assigned by the pay TV server through the product broadcasting channel requestor, provide over the Internet product broadcasting content to be broadcasted on the selected product broadcasting channel to the user terminal.

8. The e-commerce system of claim 7, wherein, if the at least one pay TV channel is selected by the user terminal as a product broadcasting channel, the product broadcasting processor connects the user terminal directly to a URL of product broadcasting content, the URL mapped to the pay TV channel.

9. The e-commerce system of claim 7, wherein, if the predetermined scheduled time period of a predetermined pay TV channel is selected by the user terminal as a product broadcasting channel, the product broadcasting processor provides product broadcasting content corresponding to a product broadcasting program identification (ID) or product ID mapped to the predetermined schedule time period of a predetermined pay TV channel by reading an URL of the product broadcasting content, the URL mapped to the product broadcasting program ID or product ID.

10. The e-commerce system of claim 7, wherein, if the channel connection menu is selected by the user terminal as a product broadcasting channel, the product broadcasting processor provides product broadcasting content mapped to the channel connection menu by reading a URL of the product broadcasting content, the URL mapped to the channel connection.

\* \* \* \* \*